(12) United States Patent
Pureepaswong

(10) Patent No.: US 11,025,153 B2
(45) Date of Patent: Jun. 1, 2021

(54) ELECTRIC GENERATOR WITH A ROTATIONAL RESISTANCE AVOIDANCE FEATURE

(71) Applicants: Tuangsin Pureepaswong, Rayong (TH); Phee Pureepaswong, Rayong (TH); Pat Pureepaswong, Rayong (TH)

(72) Inventor: Tuangsin Pureepaswong, Rayong (TH)

(73) Assignees: Phee Pureepaswong, Rayong (TH); Pat Pureepaswong, Rayong (TH); Tuangsin Pureepaswong, Rayong (TH)

( * ) Notice: Subject to any disclaimer, the term of this patent is extended or adjusted under 35 U.S.C. 154(b) by 322 days.

(21) Appl. No.: 15/774,533

(22) PCT Filed: Nov. 7, 2016

(86) PCT No.: PCT/TH2016/000091
§ 371 (c)(1),
(2) Date: May 8, 2018

(87) PCT Pub. No.: WO2017/086886
PCT Pub. Date: May 26, 2017

(65) Prior Publication Data
US 2020/0028429 A1 Jan. 23, 2020

(30) Foreign Application Priority Data
Nov. 17, 2015 (TH) .................................. 1501006914

(51) Int. Cl.
*H02K 53/00* (2006.01)
*H02K 16/00* (2006.01)
(52) U.S. Cl.
CPC ........... *H02K 53/00* (2013.01); *H02K 16/005* (2013.01)
(58) Field of Classification Search
CPC ................................ H02K 53/00; H02K 16/02
(Continued)

(56) References Cited

U.S. PATENT DOCUMENTS

| | | | | |
|---|---|---|---|---|
| 1,047,858 A | * | 12/1912 | Thomson | .................. H02P 9/00 |
| | | | | 310/109 |
| 2,211,377 A | * | 8/1940 | Heinrich | ................. B64C 13/00 |
| | | | | 310/99 |

(Continued)

FOREIGN PATENT DOCUMENTS

| | | |
|---|---|---|
| CN | 1126902 A | 7/1996 |
| CN | 201167257 Y | 12/2008 |

(Continued)

OTHER PUBLICATIONS

International Search Report and Written Opinion from International Application No. PCT/TH2016/000091, dated Jun. 5, 2017.

(Continued)

*Primary Examiner* — Jose A Gonzalez Quinones
(74) *Attorney, Agent, or Firm* — Merchant & Gould

(57) ABSTRACT

The electric generator with the rotational resistance avoidance feature in the present invention comprises a rotating set of magnet parts interposed between at least two rotating sets of conductor coil parts, which are respectively installed on opposite sides of the rotating set of magnet parts. The diameters of the rotating sets of conductor coil parts are configured to be larger than the diameter of the rotating set of magnet parts. The rotational speed of the conductor coil parts and the magnet parts are therefore different, which causes the induction of the electromotive force within the conductor coils by way of variation of the magnetic field. When the mechanical power input is applied only on the rotating set of magnet parts and the electromotive force induced in the conductor coil, which has been connected to a load, is applied to a load; the electrical current will induce the conductor coil itself to generate magnetic polarities which are similar to the original magnetic polarities of the permanent magnet. The sets of conductor coils are pushed by the said pushing force to be continuously rotated in a (Continued)

clockwise direction (freely rotated without being driven by the mechanical power input). The rotating set of magnets in the middle is also continuously rotated by the mechanical power input. With this configuration, the rotational resistance can be avoided. Therefore, the additional mechanical power input is not necessary (rather, only a partial increase is required), and the electrical power can be generated by converting the magnetic energy stored in permanent magnets, to be supplied to the load.

6 Claims, 5 Drawing Sheets

(58) Field of Classification Search
USPC .......................................... 310/101, 114, 115
See application file for complete search history.

(56) References Cited

U.S. PATENT DOCUMENTS

| | | | |
|---|---|---|---|
| 2,629,062 A * | 2/1953 | Seede | H02K 49/00 310/96 |
| 4,477,759 A | 10/1984 | Guerin et al. | |
| 5,534,737 A * | 7/1996 | Nishimura | H02K 16/00 310/112 |
| 5,734,215 A | 3/1998 | Taghezout et al. | |
| 6,376,955 B1 | 4/2002 | Arimitsu | |
| 6,411,001 B1 * | 6/2002 | Henderson | F04D 25/026 310/101 |
| 6,982,530 B2 | 1/2006 | Takeuchi | |
| 2002/0158531 A1 * | 10/2002 | Aritaka | H02K 53/00 310/152 |
| 2006/0181170 A1 * | 8/2006 | Fiset | H02K 99/00 310/113 |
| 2013/0002077 A1 * | 1/2013 | Conde Mendez | H02K 16/00 310/113 |
| 2013/0020707 A1 | 1/2013 | Conde | |
| 2013/0207504 A1 * | 8/2013 | Park | H02K 21/16 310/209 |

FOREIGN PATENT DOCUMENTS

| | | | | |
|---|---|---|---|---|
| CN | 102648568 | A | | 8/2012 |
| CN | 104104270 | A | | 10/2014 |
| EP | 1089425 | A2 | | 4/2001 |
| JP | 2004-312911 | A | | 11/2004 |
| JP | 2004312911 | A | * | 11/2004 |
| JP | 2005-192380 | A | | 7/2005 |
| JP | 2005192380 | A | * | 7/2005 ............... H02P 6/04 |
| JP | 2005-348512 | A | | 12/2005 |
| JP | 2005348512 | A | * | 12/2005 |
| JP | 2007-195375 | A | | 8/2007 |
| JP | 2011-167037 | A | | 8/2011 |
| JP | 2013-099236 | A | | 5/2013 |
| JP | 2013099236 | A | * | 5/2013 |

OTHER PUBLICATIONS

International Preliminary Report on Patentability from International Application No. PCT/TH2016/000091, dated Mar. 5, 2018.
First Office Action from Chinese Application No. 2016800635204, dated Sep. 29, 2019.
Office Action (Reasons for Refusal) from Japanese Application No. 2018-542109, dated Sep. 10, 2019.
Examination report No. 1 for Australian Application No. 2016354870, dated Apr. 4, 2020.
Russian Office Action and Search Report for Russian Application No. 2018121435/07, dated Dec. 19, 2019.

* cited by examiner

ELECTRIC GENERATOR WITH A ROTATIONAL RESISTANCE AVOIDANCE FEATURE

This application is a National Stage Application of PCT/TH2016/000091, filed 7 Nov. 2016, which claims benefit of Serial. No. 1501006914, filed 17 Nov. 2015 in Thailand and which applications are incorporated herein by reference. To the extent appropriate, a claim of priority is made to each of the above-disclosed applications.

TECHNICAL FIELD

The present invention relates to an electric generator.

BACKGROUND ART

The traditional structure of electric generators is commonly composed of two main parts, the 'stator' (stationary part) and the 'rotor' (rotating part), which are exchangeable between the magnet portion and conductor coil portion (one portion rotates while the other portion is fixed). These two parts function to convert mechanical energy into electrical energy by inputting mechanical energy into the rotor to generate electromotive force in a conductor coil as a result of the magnetic flux variation over the conductor coil. When the electrical current of the electromotive force induced in the conductor coil is applied to a load, the electrical current will induce the conductor coil itself in order to generate magnetic polarities in the conductor coil, which are similar to the original magnetic polarities that induces such electrical current. The pushing force or resisting force will occur while the similar magnetic polarities rotate towards each other. Conversely, the pulling force or attracting force will occur while the opposite magnetic polarities rotate away from each other. These forces, which are caused by newly induced magnetic polarities, will react in the opposite direction of the rotation of the mechanical power inputted into the rotor. This causes rotational resistance as well as a burden to increase the mechanical power input to overcome such rotational resistance depending on the electric power supplied to the load.

Another type of electric generator is designed to include two rotational portions. Both portions have mechanical energy input but in opposite directions. This type of electric generator still has the same effect as when the additional mechanical power input is needed to overcome the rotational resistance, depending on the electric power supplied to the load.

With respect to the above mentioned problems, the present invention intends to provide an electric generator with a rotational resistance avoidance feature to alleviate such problems.

SUMMARY OF INVENTION

The electric generator with a rotational resistance avoidance feature in the present invention comprises a plurality of magnet parts attached to the same shaft, which can be mounted in either a horizontal or vertical manner (here in after called "rotating set of magnets"), driven by the mechanical power input; and a plurality of conductor coil parts, in the same amount of magnet parts, including conductor coils attached to another shaft parallel to the shaft of the magnet parts (here in after called "rotating set of conductor coils"), which is freely rotatable without the drive of a mechanical power input. On the shaft of the rotating set of conductor coils, at least one slip ring is provided for the conductor. The reaction force of the induced magnetic polarities and electric power supplied to the load is the opposite rotational direction to the rotational direction of the said rotating set of magnets part driven by the mechanical power input, which can be either counterclockwise or clockwise. The invention is provided with at least one rotating set of magnet parts interposed between at least two similar rotating sets of conductor coil parts, Which are located at opposite sides to each other.

The structure of the rotating set of magnet parts comprise multiple permanent magnets attached to a bracket. The magnetic polarities are arranged along and fixed on the shaft axis. Opposite magnetic polarities are always located adjacent to each other. For example, the north magnetic polarity (N) of one magnet is located adjacent to the south magnetic polarity (S) of the next magnet. This arrangement allows magnetic flux from the north magnetic polarities (N) towards the south magnetic polarities (S) to complete the magnetic flux loop around the axis of the shaft which can induce the electromotive forte in the conductor coils.

The rotating set of magnet parts comprise a plurality of magnet parts fixed on the same shaft, which can be mounted in either a horizontal or vertical manner. A suitable interval between the magnets is accurately and properly set. The same magnetic polarities are located along the shaft axis. The mechanical power input is provided to drive the rotating shaft to vary the magnetic flux and induce the conductor coils of the rotating set of conductor coils on both sides. The conductor wires are rolled td form a plurality of the conductor coils, and their length is extended along the shaft axis. The number of the conductor coil parts along the shaft axis corresponds to the number of magnet parts along the shaft axis. The length of each conductor coil is configured to be greater than or equal to the length of each related magnet. The cross-sectional area of the conductor coil is configured to be greater than or equal to the cross-sectional area of the magnet. This is to allow the size of magnetic polarity generated at the conductor coil along the shaft axis to be larger than or equal to the size of the magnetic polarity of each magnet.

The structure of the rotating set of conductor coil parts comprise conductor coils which extend along the shaft axis. The number of conductor coil parts along the shaft axis corresponds to the number of magnet parts along the shaft axis. The conductor coils are fixed into the slots of the cog cylindrical rotor, which are fixed around the shaft. The slip ring is provided on the shaft to allow the transmission of the generated electrical power from the rotating conductor coils, which has been connected to a circuit to be supplied to the load. The diameter of the cog cylindrical rotor of the rotating set of conductor coil parts must be larger than the diameter of the magnet parts. The slots of the cog cylindrical rotor of conductor coils are provided along the shaft axis and around the peripheral circumference of the cylindrical rotor. The number of the conductor coil parts along the shaft axis corresponds to the number of magnet parts along the shaft axis.

Preferably, conductor wire shall be used in the conductor coils of the electric generator according to the present invention, which may be made of metal or any other type of conductor material.

Preferably, the conductor wire used in the conductor coils of the electric generator according to the present invention may be made of copper, aluminum, silver or any other conductor metal material The objective of the present invention is to alleviate the effect of the rotational resistance which occurs in a traditional electric generator. The increase of mechanical power input to overcome the said effect is necessary depending on the electric power supplied to the load. Conversely, the electric generator of the present invention converts such rotational resistance, generated by the induced magnetic polarities when the electric power is supplied to the load; to be the mechanical force to push the rotating sets of conductor coil parts on both sides to freely rotate in the opposite direction of the rotating sets of magnets in-between, which is driven by the mechanical power input. This arrangement can avoid the rotational resistance during the generation of electrical power from the potential magnetic energy when the electrical power is supplied to the load. Therefore, the additional mechanical power input according to the related load is not necessary (rather, only a partial increase is required), and the output electric energy generated by the electric generator of the present invention can be supplied to the load.

DESCRIPTION OF EMBODIMENTS

Figure 1:
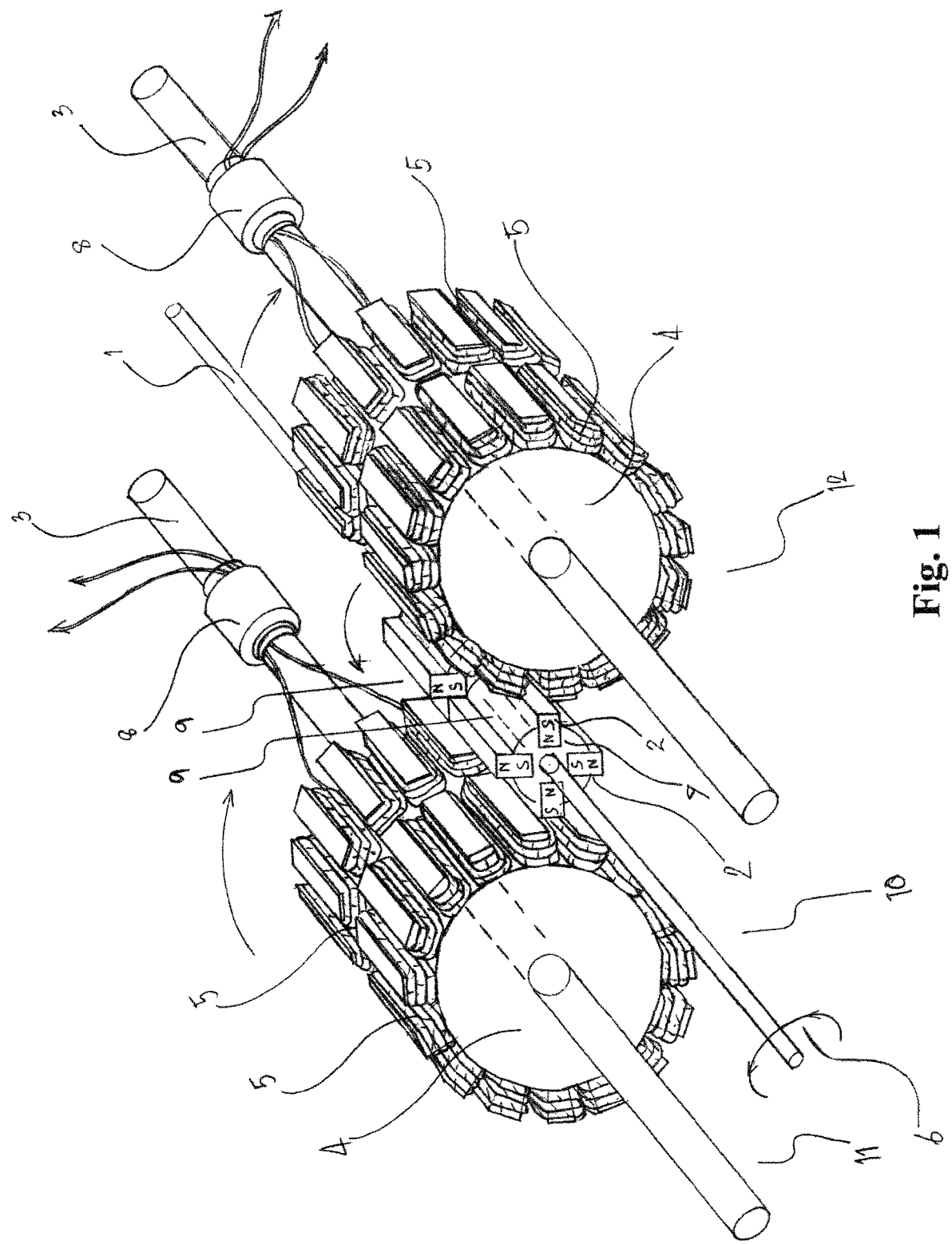
FIG. 1 is the perspective view of a prototype of the electric generator with the rotational resistance avoidance feature of the present invention.

FIG. 1 is the perspective view of a prototype of the electric generator with the rotational resistance avoidance feature of the present invention. The electric generator of the present invention comprises a rotating set of magnet parts 10 attached to the shaft axis, for example, in a horizontal manner, interposed between at least two rotating sets of conductor coil parts 11, 12, which are respectively installed on opposite sides of the rotating set of magnet parts. The diameters of the cylindrical rotors of the rotating sets of conductor coil parts 11, 12 are configured to be larger than the diameter of the cylindrical rotor of the rotating set of magnets parts. The rotational speed of the conductor coil parts and the magnet parts are therefore different, which causes the induction of the electromotive force within the conductor coils by way of the variation of the magnetic field. The mechanical power input 6 is applied only on the shaft of the rotating set of magnet parts 10.

Figure 3:
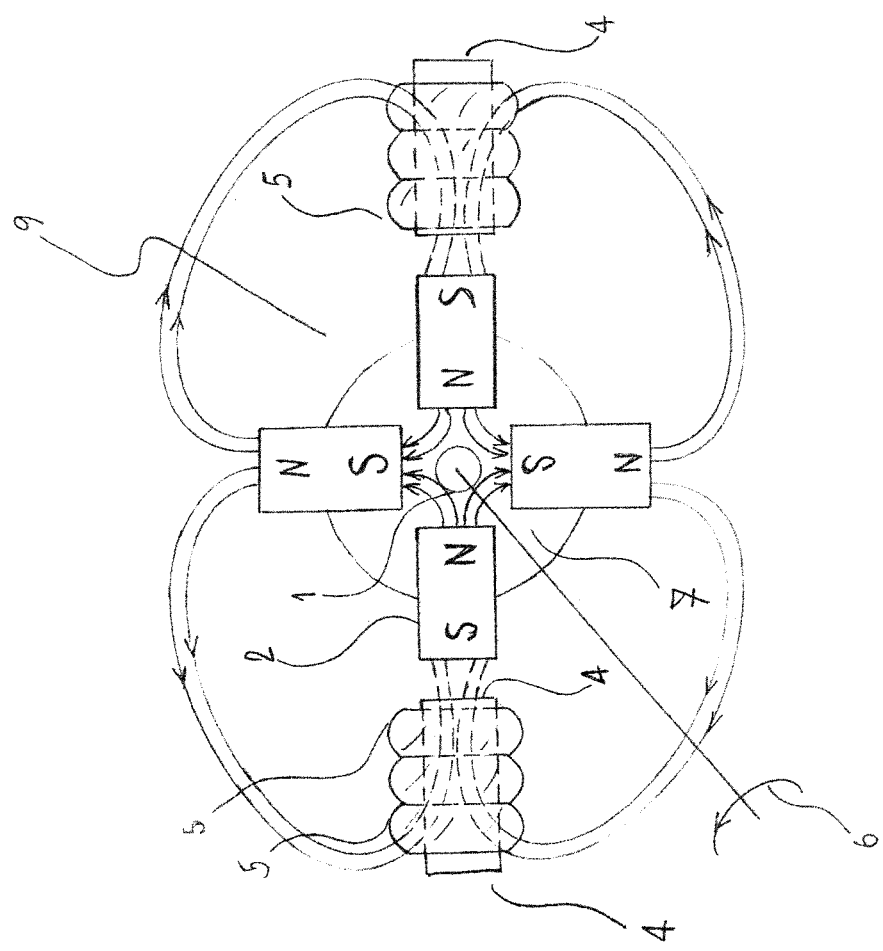
FIG. 3 is the enlarged front view, illustrating the direction of the magnetic flux around the rotating shaft of the rotating set of magnet parts.
Figure 3:
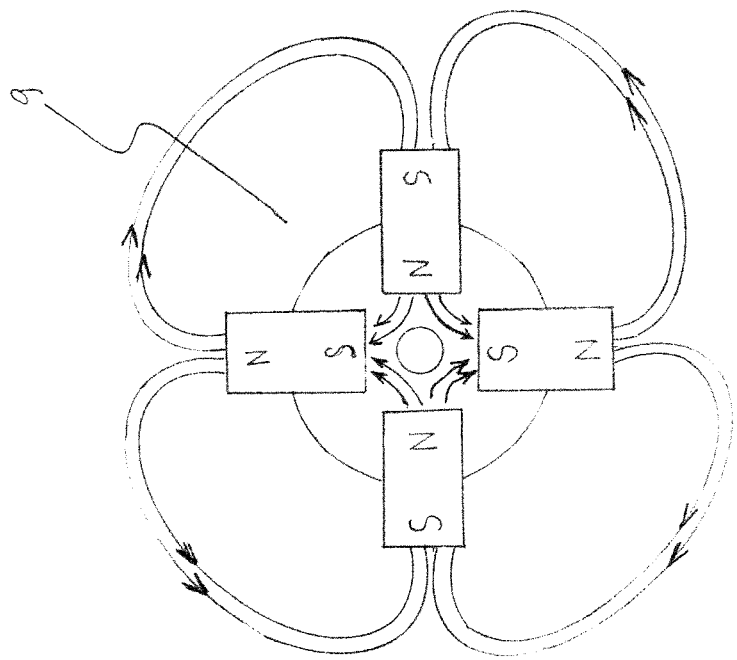

The structure of each magnet part 9 comprises multiple permanent magnets 2 attached to a bracket 7, which is fixed on to shaft 1 of the rotating set of magnet parts. The magnetic polarities are arranged along the shaft axis, which allows magnetic flux from the north magnetic polarities (N) towards the south magnetic polarities (S) to complete the magnetic flux loop around the axis of the shaft 1 as illustrated in FIG. 3, thereby induce the electromotive force in the conductor coils 5.

The rotating set of magnet parts 10 comprise a plurality of magnet parts 9 fixed on the same shaft 1. The suitable interval between the magnet parts 9 is accurately and properly set. The same magnetic polarities are located along the shaft axis 1. The mechanical power input 6 is provided to drive the rotating shaft 1 to vary the magnetic flux and induce the conductor coils 5 of the rotating set of conductor coils on both sides. The conductor wire is rolled to form a conductor coil 5, and its length is extended along the shaft axis. The number of the conductor coil parts corresponds to the number of magnet parts 9. The length of each of the conductor coils 5 is configured to be greater than or equal to the length of each of its related magnet parts 9. The cross-sectional area of the conductor coil 5 is configured to be greater than or equal to the cross-sectional area of the magnet part 9. This is to allow the size of the magnetic polarity generated at conductor coil 5 along the shaft axis 3 to be larger than or equal to the size of the magnetic polarity of each magnet part 9.

The structure of the rotating set of conductor coil parts 11, 12 comprise conductor coils 5, which extend along the shaft axis. The number of the conductor coils 5 corresponds to the number of magnet parts 9. The conductor coils 5 are fixed into the slots of the cog cylindrical rotor 4, which are fixed around the shaft 3. The slip ring 8 is provided on the shaft 3 to allow the transmission of the generated electrical power from the rotating conductor coils 5 which have been connected to a circuit to be supplied to the load. The diameter of the cog cylindrical rotor 4 of the rotating set of conductor coils 5 must be larger than the diameter of the magnet parts 9. The slots of the cog cylindrical rotor 4 of the conductor coils are provided along the shaft axis and around the peripheral circumference of the cylindrical rotor. The number of the conductor coil parts 5 corresponds to the number of magnet parts 9.

Preferably, conductor wire used in the conductor coils of the electric generator, according to the present invention, may be made of metal or any other type of conductor material.

Preferably, conductor wire used in the conductor coils of the electric generator, according to the present invention, may be made of copper, aluminum, silver or any other conductor metal material.

The electric generator with a rotational resistance avoidance feature of the present invention functions when mechanical power input 6 is applied to rotate the shaft (1) counterclockwise; and the magnetic flux, from north magnetic polarities (N) towards south magnetic polarities (S), of all four sides of each pole around the shaft 1 will vary in relation to the conductor coils 5, which have been connected to a circuit. Then the electromotive force is induced and the electrical current will be transmitted through slip rings 8. When the electromotive force is applied to the load, the electrical current will induce the conductor coils 5 to generate magnetic polarities itself, which are similar to the original magnetic polarities of the permanent magnet 2. The pushing force will push the sets of conductor coils 11, 12 to continuously rotate in a clockwise direction. The rotating set of magnets in the middle is also continuously rotated by the mechanical power input 6. The reaction between the rotating set of magnets 10 and the rotating sets of conductor coils 11, 12 results in the rotational resistance being avoided when the electric power is generated and supplied to the load. Therefore, the additional mechanical power input 6 according to the related load is not necessary (rather, only a partial increase is required), and the electrical power can be generated by converting the energy stored in permanent magnets to be supplied to the load.

Figure 2:
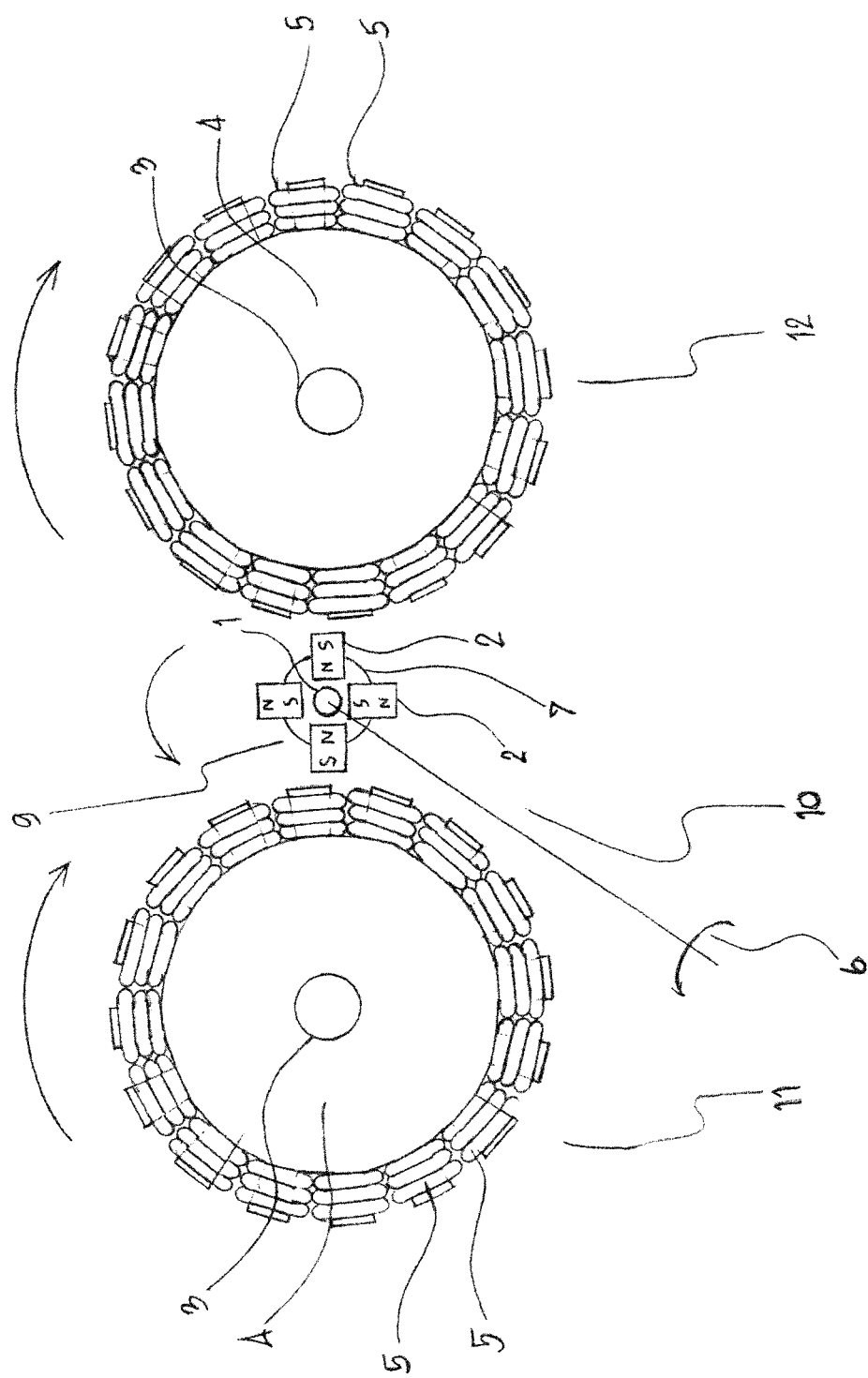
FIG. 2 is the front view of the electric generator with the rotational resistance avoidance feature of FIG. 1.
Figure 4:
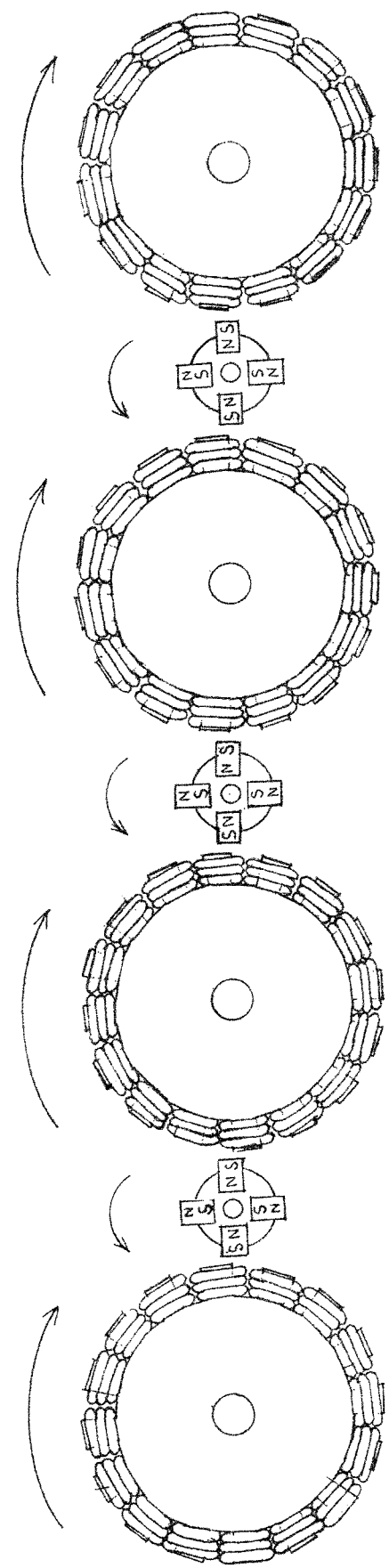
FIG. 4 is the front view of the capacity expansion of the generator of FIG. 2, in the horizontal direction for higher power generation.
Figure 5:
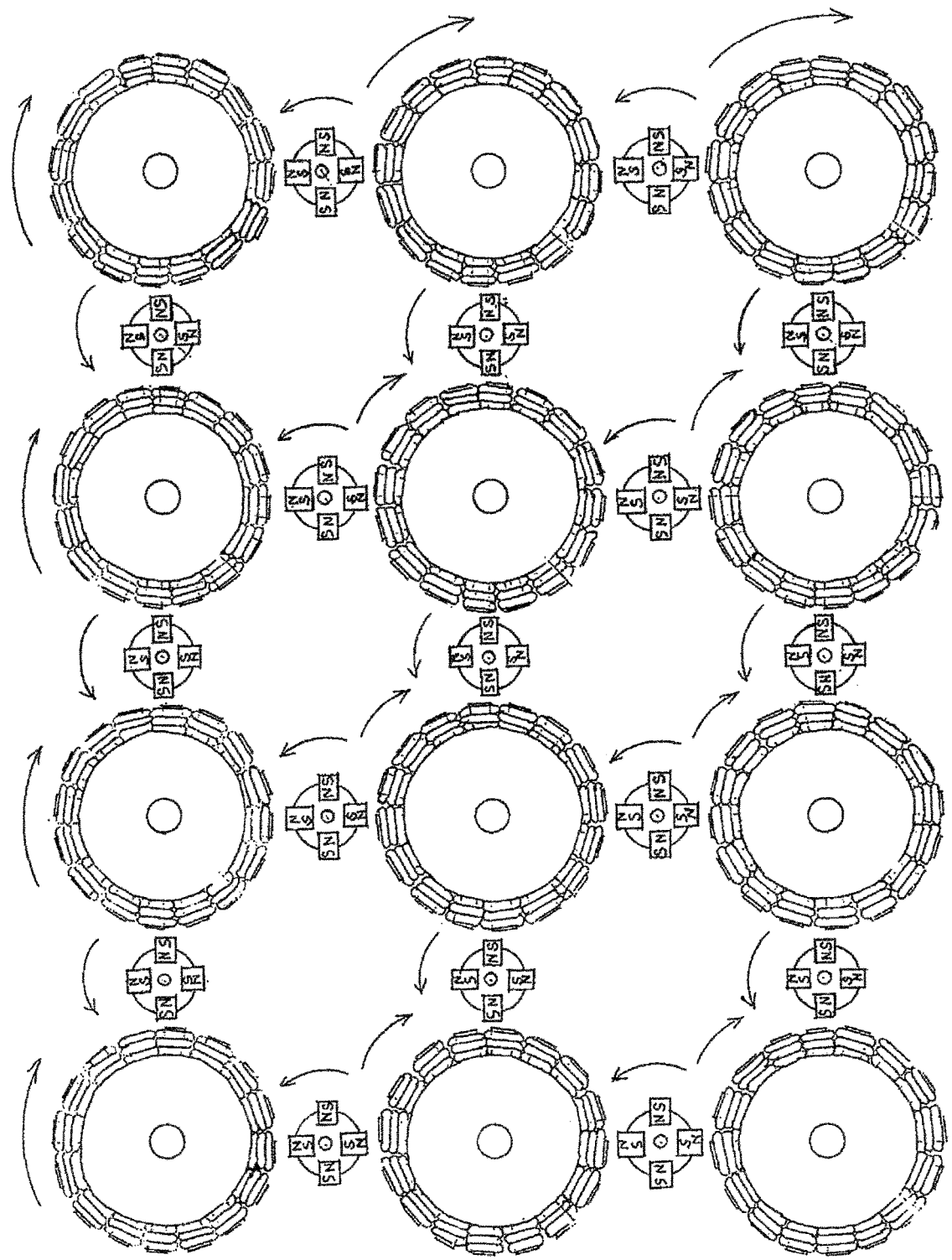
FIG. 5 is the front view of the capacity expansion of the generator of FIG. 2, in both vertical and horizontal directions for practical application in the power plant.

FIG. 2 is the front view of the electric generator with the rotational resistance avoidance feature of FIG. 1 illustrating the rotational direction of the mechanical power input of FIG. 1 for further illustration of the capacity extension in FIGS. 4 and 5.

FIG. 3 is the enlarged front view illustrating the direction of the magnetic flux around the rotating shaft of the rotating set of magnet parts.

FIG. 4 is the front view of the capacity expansion of the generator of FIG. 2 in the horizontal direction. For example, this embodiment is provided with three rotating sets of magnets driven by the same direction of the mechanical power input 6, and with four rotating sets of conductor coils as illustrated in FIG. 4.

FIG. 5 is the front view of the capacity expansion of the generator of FIG. 2 in both vertical and horizontal directions for practical application in the power plant. Each of the electric generators with a rotational resistance avoidance feature in the present invention can be horizontally expanded on the same plane and vertically expanded in other directions. All those rotating sets of magnet parts must be driven in the same direction by the mechanical power input.

The invention claimed is:

1. An electric generator, comprising a rotating set of magnet parts mounted on a shaft interposed between at least two rotating sets of conductor coil parts installed parallel to the shaft axis of both sides of the magnet parts, wherein:
   the diameters of the rotating sets of conductor coil parts are larger than the diameter of the rotating set of magnet parts, thus to cause different rotational speeds of the sets of conductor coil parts and the set of magnet parts;
   the rotating set of magnet parts comprises a plurality of magnet parts fixed on the same shaft;
   each magnet part comprises multiple permanent magnets attached to a bracket fixed on the shaft;
   each rotating set of conductor coil parts comprises a plurality of conductor coil parts;
   each conductor coil part comprises conductor coils extending along a shaft axis of each set of the conductor coil parts;
   the conductor coils are fixed into slots of a cog cylindrical rotor fixed around the shaft of each set of conductor coil parts and along the shaft axis and around the peripheral circumference of the cog cylindrical rotor, and each conductor coil is formed by rolled conductor wire;
   the cog cylindrical rotor of the rotating conductor coils has a diameter larger than the diameter of the magnet parts;
   the number of conductor coil parts corresponds to the number of magnet parts;
   the magnetic polarities of the permanent magnets are arranged along and fixed on the shaft axis, and the same magnetic polarities are located along the shaft axis, and with the magnetic flux from the north magnetic polarities (N) towards the south magnetic polarities (S) to complete the magnetic flux loop around the shaft axis, so as to induce the electromotive force in the conductor coils;
   slip rings are provided on the shaft of each set of conductor coil parts and allow the transmission of generated electrical power from the rotating conductor coils, which are connected to a circuit, to the load; and
   wherein, when a mechanical power input is only applied to and rotates the shaft of the rotating set of magnet parts, the magnetic flux from north magnetic polarities (N) towards the south magnetic polarities (S) of each pole around the shaft varies in relation to the conductor coils, and the magnetic flux changes and the electromotive force in the conductor coils on both sides is induced, and electrical current from the rotating conductor coils is transmitted through the slip rings and supplied to a load, and the electrical current induces the conductor coil itself to generate magnetic polarities similar to the original magnetic polarities of the permanent magnet, and a pushing force occurs while the magnetic polarities of the permanent magnets rotate, and the sets of inductor coils are pushed by said pushing force to be rotated in a direction opposite to the rotational direction of the rotating set of magnets.

2. The electric generator of claim 1, wherein the capacity of the electric generator is expanded in at least one or two of the vertical and horizontal directions in a serial manner, and all those rotating sets of magnets, must be driven by the mechanical power input in the same direction.

3. The electric generator of claim 1, wherein conductor wire used in the said conductor coils is made of metal or any other type of conductor material.

4. The electric generator of claim 1, wherein conductor wire used in the said conductor coils is made of copper, aluminum, silver or any other conductor metal material.

5. The electric generator of claim 2, wherein conductor wire used in the conductor coils is made of metal or any other type of conductor material.

6. The electric generator of claim 2, wherein conductor wire used in the conductor coils is made of copper, aluminum, silver or any other conductor metal material.

* * * * *